United States Patent
Syllaios (10) Patent No.: US 11,022,823 B2
(45) Date of Patent: Jun. 1, 2021

(54) SWITCHABLE OPTICAL FILTER FOR IMAGING AND OPTICAL BEAM MODULATION

(71) Applicant: University of North Texas, Denton, TX (US)

(72) Inventor: Athanasios J. Syllaios, Denton, TX (US)

(73) Assignee: University of North Texas, Denton, TX (US)

(*) Notice: Subject to any disclaimer, the term of this patent is extended or adjusted under 35 U.S.C. 154(b) by 259 days.

(21) Appl. No.: 16/058,759

(22) Filed: Aug. 8, 2018

(65) Prior Publication Data
US 2019/0049755 A1    Feb. 14, 2019

Related U.S. Application Data

(60) Provisional application No. 62/542,748, filed on Aug. 8, 2017.

(51) Int. Cl.
*G02F 1/03* (2006.01)
*G02F 1/07* (2006.01)
*G02F 1/015* (2006.01)

(52) U.S. Cl.
CPC .......... *G02F 1/015* (2013.01); *G02F 2201/38* (2013.01); *G02F 2203/01* (2013.01)

(58) Field of Classification Search
CPC ......... B82Y 20/00; B82Y 30/00; G02F 1/157; G02F 1/0316; G02F 2202/32; G02B 5/0808
USPC ....................................................... 359/245
See application file for complete search history.

(56) References Cited

U.S. PATENT DOCUMENTS 10,038,171 B2 * 7/2018 Sakuishi ................ H01L 51/56
2019/0326444 A1 * 10/2019 Akimoto ............... H01L 21/465

* cited by examiner

*Primary Examiner* — William R Alexander
*Assistant Examiner* — Tamara Y. Washington
(74) *Attorney, Agent, or Firm* — Norton Rose Fulbright US LLP (57) ABSTRACT switchable optical filter that is based on carrier injection induced semiconductor to metal phase transition (SMT) of vanadium oxide-based (e.g., $VO_2$) thin films may reversibly change from optically transparent to opaque while undergoing such phase transition. Electrical carrier injection may be established by an electric field or by photoexcitation. The SMT may also be induced by a combination of applying an electric field and optical flux. Such a switchable optical filter, when inserted in the optical path of an optical radiation sensor, may be used to control and/or limit high power optical beams, such as a laser beam impinging on one or more sensor elements. Since the SMT may be configured to occur at ultrafast time scales (e.g., approximately 100 femtoseconds), it may also act as a beam shutter and/or as a fast optical beam modulator.

20 Claims, 7 Drawing Sheets

SWITCHABLE OPTICAL FILTER FOR IMAGING AND OPTICAL BEAM MODULATION

CROSS-REFERENCE TO RELATED APPLICATION

This application claims the benefit of U.S. Provisional Patent Application No. 62/542,748 entitled, "SWITCHABLE OPTICAL FILTER FOR IMAGING AND OPTICAL BEAM MODULATION," filed on Aug. 8, 2017, which is expressly incorporated by reference herein in its entirety.

GOVERNMENT INTEREST

This invention was made with government support under Prime Contract No. W909MY-015-C-0011 awarded by the U.S. Army Night Vision and Electronic Sensors Directorate. The government has certain rights in the invention.

TECHNICAL FIELD

The present application relates to optical filters, and more specifically to a switchable optical filter.

BACKGROUND

An optical filter is a device or material which can be used to change the spectral composition of an incoming electromagnetic field. Their spectral behavior is described in terms of wavelength and based on the application, and they can operate in the visible, ultraviolet or near infrared wavelength regions. Optical filters are usually implemented in the optical path as a glass plane or plastic device which are either dyed in bulk or have interference coatings. A switchable optical filter is an optical filter which can rapidly switch between transmission and optical rejection electronically.

Vanadium Dioxide ($VO_2$) films have been proposed to control optical flux incident on optical detectors by acting as in line attenuators (e.g., windows), and also to modify and frustrate the absorbance of bolometer pixels in uncooled infrared focal plane arrays. However, these proposals have been based on thermally activated phase transition of $VO_2$ films from a semiconductor transmitting phase to a metallic reflecting state. In the case of window attenuators, thermal activation of the phase transition requires high power input and high thermal isolation to raise the film temperature above the phase transition temperature. Also, the thermal time constant is high for practical thermal conductance designs resulting in slow thermal response. In the second class of modulators, the $VO_2$ film deposition temperature (ca. 400° C. to 500° C.) is incompatible with the bolometer low temperature fabrication process. There have been some uses of vanadium oxides for optical filters, however, these are based on a thermally activated phase transition rather than electrical carrier injection.

SUMMARY

The present application is directed to embodiments of a switchable optical filter that is based on carrier injection induced semiconductor to metal phase transition (SMT) of vanadium oxide-based (e.g., $VO_2$) thin films which can reversibly change from optically transparent to opaque while undergoing such phase transition. Embodiments provide an innovative technique for phase transition with electrical carrier injection either by electric field or photoexcitation. The concept of integrating $VO_2$ into a high impedance Metal-Insulator-Semiconductor (MIS) diode structure provides for improved performance and usability. In some instances, the structure may achieve phase transition in less than 1 picosecond while being highly power efficient.

It is appreciated that the described vanadium dioxide films have a wide range of applications in fast optical switchable IR filters like optical detector windows (smart windows), optical modulators and shutters. The films can also be used as smart coatings on glasses. These may include protective overlayers for sensitive infrared detectors, nonlinear optical switches, fiber-optic pressure sensors, and electrically or optically triggered transistors that could switch hundreds of times faster than conventional silicon devices.

Electrical carrier injection may be established by an electric field or by photoexcitation. The SMT may also be induced by a combination of applying an electric field and optical flux. Such a switchable optical filter, when inserted in the optical path of an optical radiation sensor, may be used to control and/or limit high power optical beams, such as a laser beam impinging on one or more sensor elements. Since the SMT may be configured to occur at ultrafast time scales (e.g., approximately 100 femtoseconds), it may also act as a beam shutter and/or as a fast optical beam modulator. The change of $VO_2$ optical constants induced by the SMT extends from the visible to the terahertz (THz) spectral range. With appropriate anti-reflection (AR) coatings and substrates, the disclosed switchable optical filter may be used in Short Wave Infrared (SWIR), Mid Wave Infrared (MWIR), Long Wave Infrared (LWIR) and THz cooled and uncooled optical sensor and imaging systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Various features and advantageous details are explained more fully with reference to the non-limiting embodiments that are illustrated in the following drawings and detailed description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The present disclosure proposes a solution that overcomes the drawbacks of prior proposals described above through techniques for activation of the $VO_2$ phase transitions by charge injection from photoexcitation and/or from an electric field. In aspects, the semiconductor to metal phase transition in $VO_2$ may be induced by thermal excitation, or by carrier injection that may be established by photoexcitation or by an electric field. Electric field induced SMT may significantly change the $VO_2$ optical constants. The SMT may also be induced by a combination of applying an electric field and optical flux. Carrier injection triggered SMT in $VO_2$ may be implemented according to embodiments of the present disclosure to develop fast optical switchable infrared (IR) filters, such as optical detector windows, optical modulators and shutters, and the like.

Figure 1:
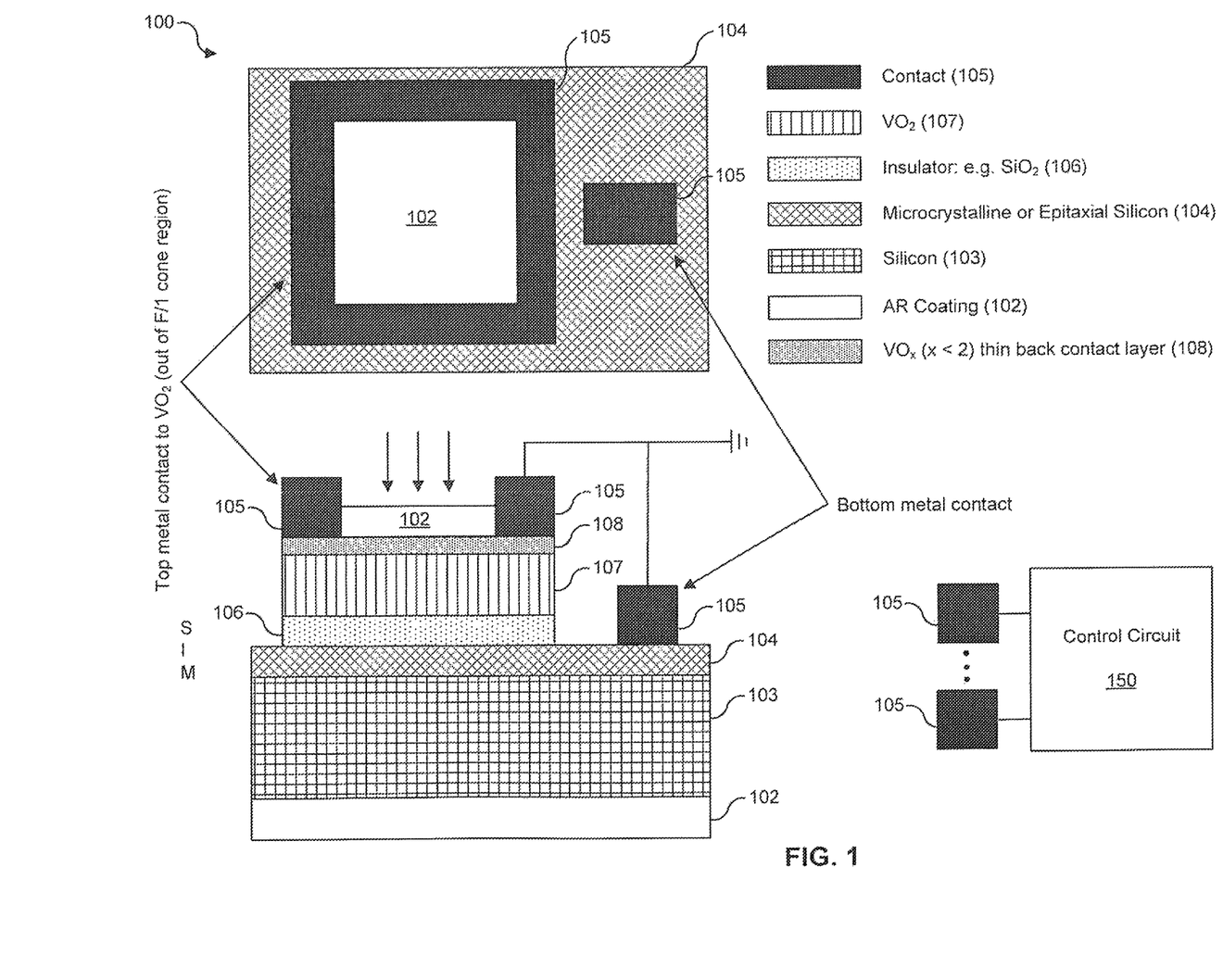
FIG. 1 illustrates a switchable optical filter in accordance with an embodiment of the present application.

FIG. 1 illustrates a switchable optical filter 100 in accordance with an embodiment of the present application. More specifically, in FIG. 1 a $VO_2$ optical filter on AR coated silicon window concept based on electric field induced SMT is shown. Switchable optical filter 100 includes one or more AR layers 102, silicon layer 103, a microcrystalline or epitaxial silicon layer 104, contact portions 105, insulator layer 106 (such as $SiO_2$), $VO_2$ layer 107, and $VO_x$(x<2) thin back contact layer 108.

As illustrates, in the charge injection induced $VO_2$ phase transition approach, the $VO_2$ layer 107 is integrated into a high impedance Metal-Insulator-Semiconductor (MIS) diode structure. In aspects, the metal may be a degenerately doped low resistivity microcrystalline or polycrystalline silicon layer 104; the insulator 106 may be an oxide; and the semiconductor may be the phase transition $VO_2$. In these cases the phase transition may be isothermal and fast (e.g., less than 1 picosecond).

Switchable optical filter 100 may be configured to be connected to control circuit 150. Control circuit 150 may be programmed to implement the switching functionality of optical filter 100 based on whatever implementation filter 100 is being used. For example, in a smart window setting, filter 100 may be configured to be switched manually or automatically based on other input data (e.g., light sensors). Control circuit 150 may also be configured to control a plurality of optic filters 100 present in a single device when attached to multiple contact portions 105 of separate filters. One of skill in the art would readily understand how to implement control features based on various applications in order to switch states of optical filter 100.

In some embodiments, the $VO_2$ MIS optical filter may be biased vertically, and the top metal contact ring to the "semiconductor" $VO_2$ and the bottom contact to the "metal n+ or p+ microcrystalline silicon" layer in the MIS structure may be placed at the edge of the optical filter outside the F/1 (or the applicable F number) cone of incident radiation. This may result in no (or very little) additional loss in transmission due to contact or bus metal in the field of view. Furthermore, the MIS diode offers the potential for a power efficient high impedance structure.

The MIS optical filter design implements an operating mode whereby the MIS diode may be biased to the point where an incident light source (e.g., laser) threat (while still at sub damage threshold flux level) triggers the $VO_2$ phase transition thereby cutting off transmission in the region of the light source threat and protecting threatened pixels in the FPA. It is noted that unthreatened pixels in the FPA may continue to image normally.

In aspects, a conductive thin germanium (Ge) layer, which is usually the first layer of an AR coating 102, may be added. This may improve the uniformity of electric potential on the back surface of the $VO_2$ layer 107 resulting in a uniform electrical ground plane. Alternately or in addition, the back surface of the $VO_2$ semiconductor may be terminated by an oxygen deficient $VO_x$ layer 108, with x<2, that is more conductive, and thus facilitates the establishment of a uniformly grounded back surface.

It is noted that in additional aspects, the "metal" gate layer in the MIS diode illustrated in FIG. 1 may be formed from other material different than microcrystalline silicon, such as epitaxial n+ or p+ doped silicon, polysilicon, germanium, silicon-germanium alloy, other semiconductor layer, or a thin semitransparent metal film. In the case of SWIR optical systems, the silicon substrate may be replaced with quartz glass or sapphire and Indium Tin Oxide (ITO) or Zinc Oxide can be used as the gate "metal."

According to Mott SMT theory, the phase transition in $VO_2$ occurs when the electrical carrier concentration reaches a critical value $n_c$ given by:

$$n_c = \left(\frac{0.25}{a_B}\right)^3 = 2.82 \times 10^{18} \text{ cm}^{-3} \qquad \text{Equation 1}$$

where $a_B \approx 18A$ is the Bohr radius of $VO_2$.

Figure 2:
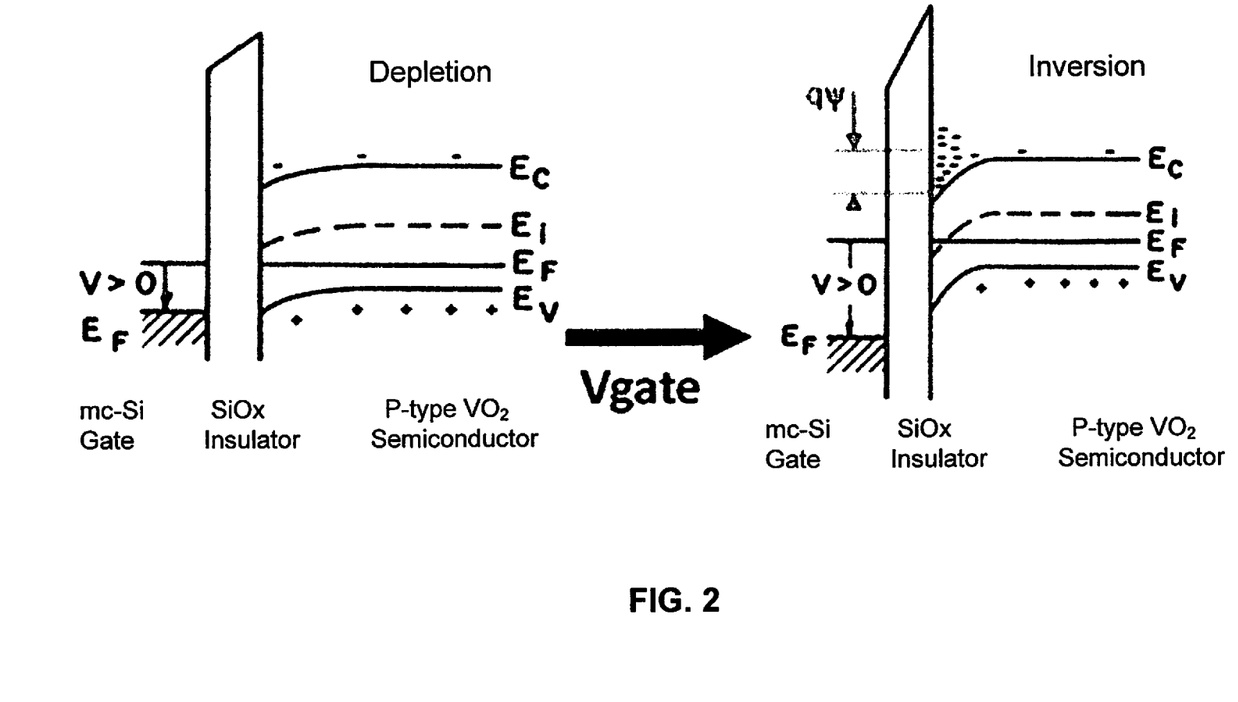
FIG. 2 illustrates energy band diagrams for $VO_2$ utilized in accordance with described optical filter embodiments.

In an MIS diode structure, $n_c$ may be reached by an applied gate bias. In the semiconductor phase, $VO_2$ is a p-type semiconductor with Eg=0.67 eV band gap. Applying a positive bias voltage at the micro-crystalline silicon gate, the $VO_2$ bands bend downward and the number of electrons (minority carriers) increases and the $VO_2$ surface layer is inverted. If the $VO_2$ film is an n-type, applying a positive gate voltage may again bend the bands downward and in this case electrons (majority carriers) may be accumulated in the surface layer. The inversion regime for p-type $VO_2$ are shown in FIG. 2.

If the number of surface electrons is higher than a threshold value, $n_c$, phase transition is induced. FIG. 2 illustrates energy band diagrams for $VO_2$ utilized in accordance with the above embodiments, and illustrates that, as the applied gate voltage V increases, band bending increases and carriers are injected to the $VO_2$ film to trigger SMT.

In the case of carrier injection in the $VO_2$ film by photoexcitation the inversion or accumulation layers in p-type or n-type $VO_2$ will be modified to accommodate the generated carriers. Photoexcitation of carriers may take place in the absence of a bias voltage. Thus, the optical filter design illustrated in FIG. 1 switches phase for incident optical flux above a certain threshold.

Figure 3:
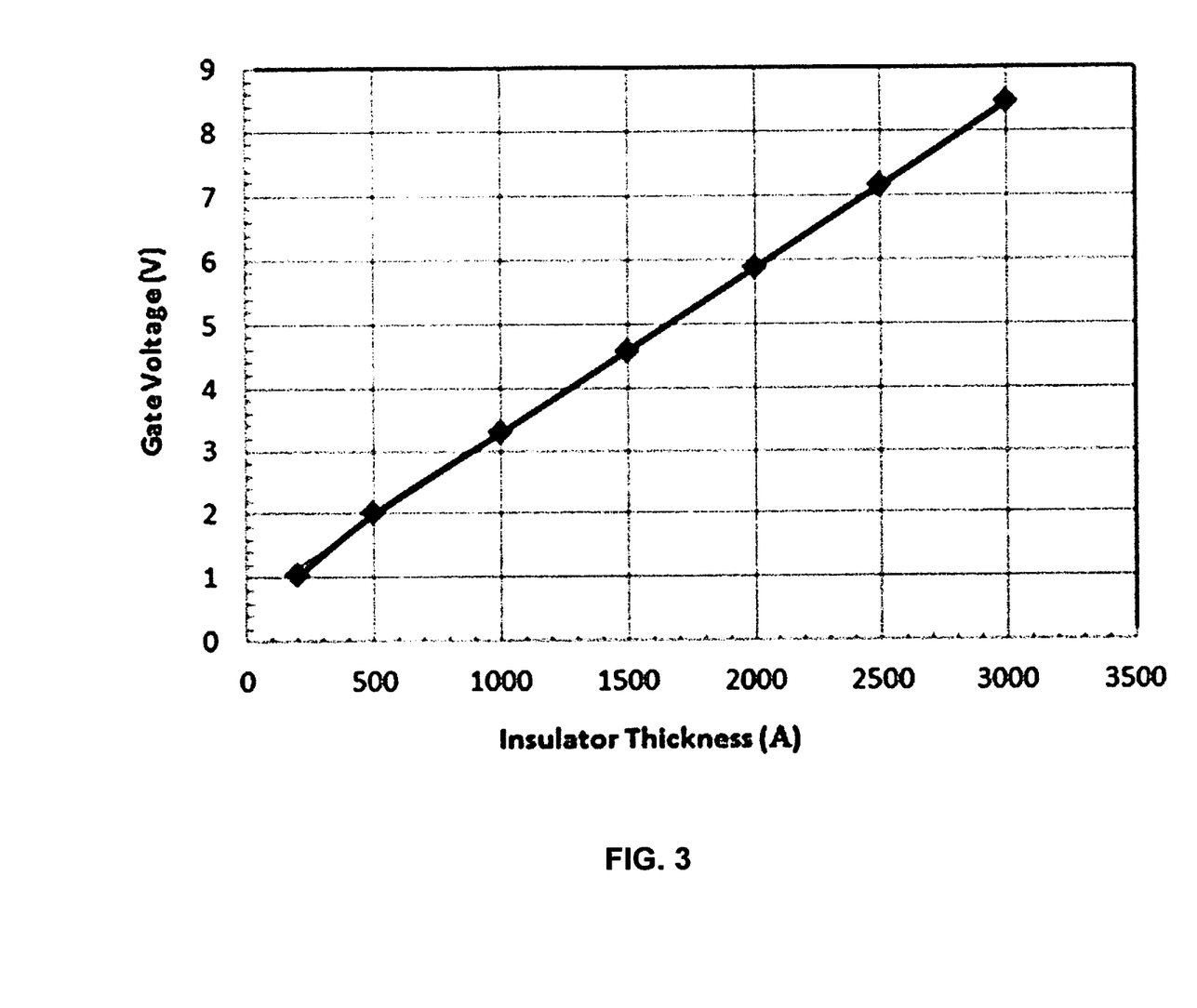
FIG. 3 illustrates gate bias voltage needed to inject carriers in the inversion layer for typical values of insulator layer thickness in accordance to aspects of the present application.

FIG. 3 illustrates the gate bias voltage necessary to inject carriers in the inversion layer equal to the critical value $n_c$ for typical values of the insulator ($SiO_x$) layer thickness in accordance to aspects of the present application. As shown in FIG. 3, the gate voltage required to induce the SMT in the $VO_2$ layer is the range of 1 volt to 9 volts for insulator thickness of ~500 A to 3000 A. In the example of FIG. 3, the acceptor density in the $VO_2$ semiconductor was assumed to be $N_A=1\times10^{20}$ cm$^{-3}$.

In the case of carrier injection in the $VO_2$ film by photoexcitation the inversion or accumulation layers in p-type or n-type $VO_2$ may be modified to accommodate the generated carriers. Photoexcitation of carriers may take place in the absence of a bias voltage. Thus, in aspects, the optical filter illustrated in FIG. 1 may switch phase for incident optical flux above a certain optical fluence threshold. In the case of unbiased MIS, the fluence threshold may be proportional to the Mott critical carrier density $n_c$. In the presence of gate bias, the fluence threshold may be proportional to the carrier density difference ($n_c-n_{vB}$), where $n_{vB}$ is the carrier density generated by an applied gate bias voltage.

Figure 4:
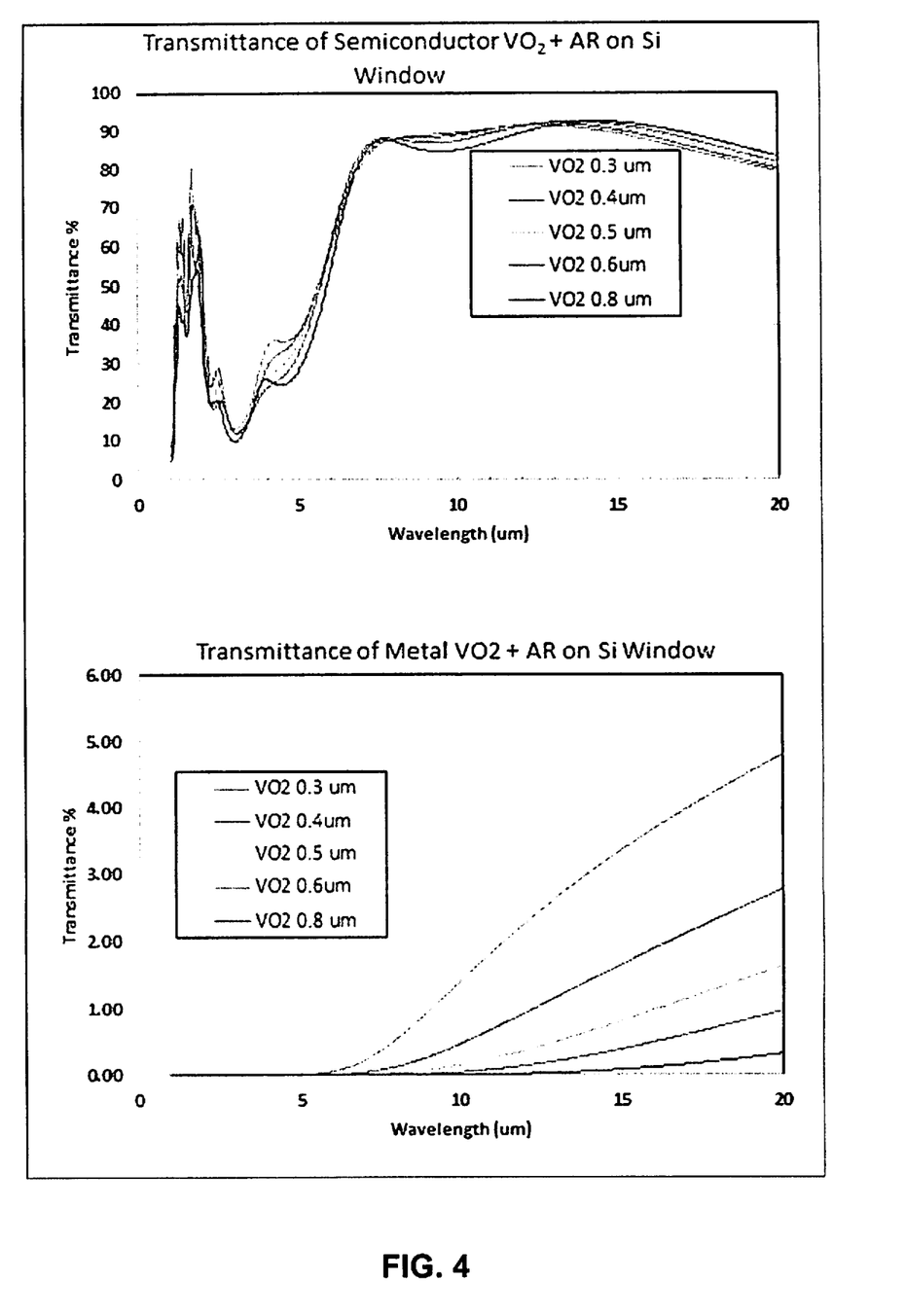
FIG. 4 illustrates spectral transmittance values for an optical filter configured according to the structure described in FIG. 1.

To improve transmittance, an AR coating may be placed over the $VO_2$ layer of the MIS diode, and on the opposite silicon window surface, as shown above in FIG. 1. In FIG. 4, spectral transmittance for a MIS $VO_2$ optical filter configured according to the structure described in FIG. 1 and having a $VO_2$ thickness in the range 0.3 to 0.8 μm is shown for both the transmitting state and the reflecting state.

The optical constants used for the $VO_2$ layers in the semiconducting "transmitting" state and in the metal "reflecting" state are shown in TABLE 1 below.

TABLE 1

$VO_2$ optical constants

| | Refractive index (n) | Extinction Coefficient (k) |
|---|---|---|
| $VO_2$ layer (Semiconductor State) | 2.55 | 0.08 |
| $VO_2$ layer (Metal State) | 8 | 9 |

Figure 5:
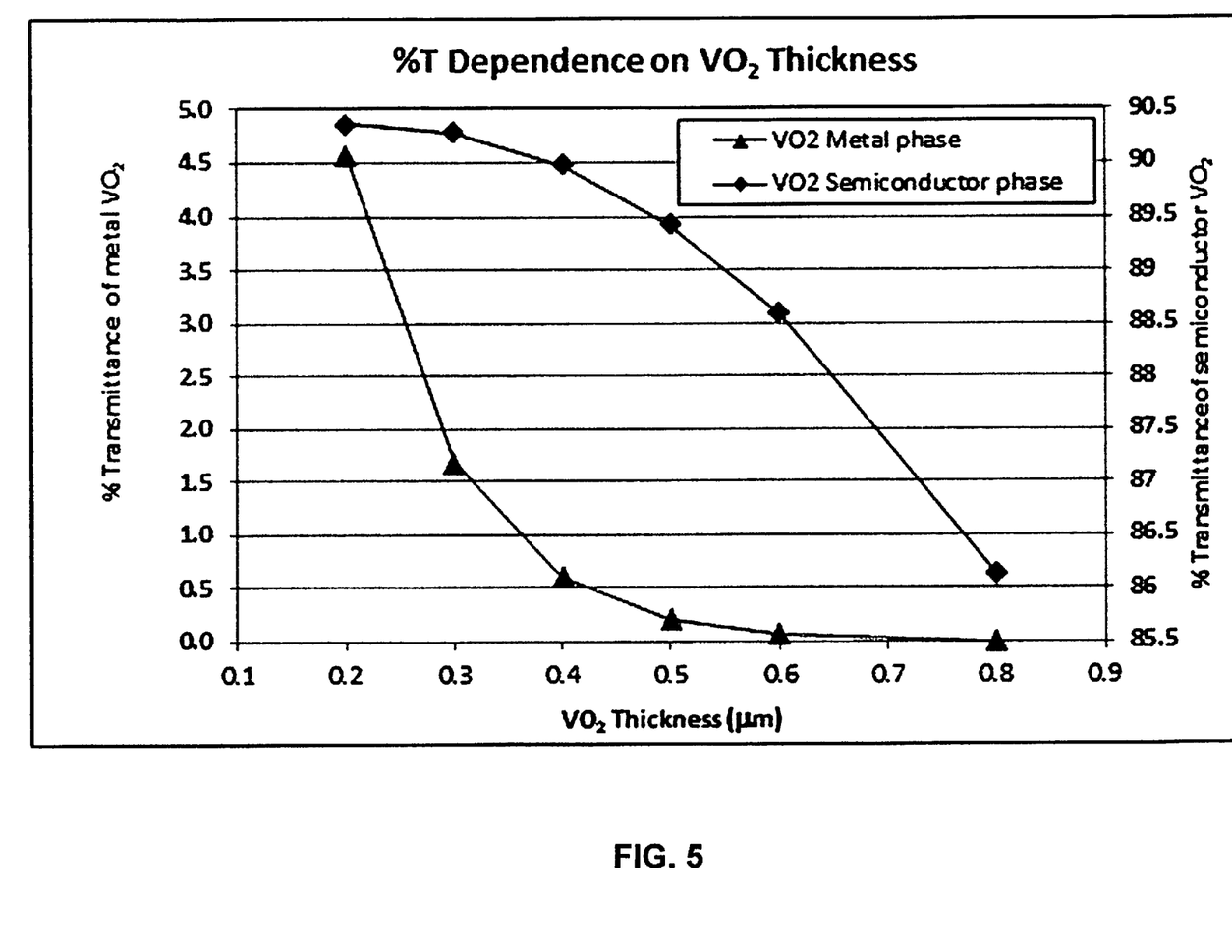
FIG. 5 illustrates a plot showing transmittance values as a function of $VO_2$ layer thickness in accordance with an embodiment of the present application.

For the specific case of incident flux from a Carbon Dioxide ($CO_2$) Laser at wavelength λ=10.6 μm, the $VO_2$ semiconductor phase and metal phase optical filter transmittance at λ=10.6 μm as a function of $VO_2$ layer thickness is shown in FIG. 5.

As shown in FIG. 5, the 10.6 μm "un-switched, semiconductor" state transmittance may be relatively insensitive to $VO_2$ layer thickness, decreasing from approximately 90% at 0.2 μm to approximately 86% at 0.8 μm. In contrast, the transmittance leakage in the "switched, metal" state improves from 4.56% at 0.2 μm to 0.01% at 0.8 μm $VO_2$ layer thickness. This means that an optical filter design with $VO_2$ thickness 0.6 mm or thicker may efficiently control $CO_2$ laser radiation.

In summary, embodiments may include an optical filter element that includes a vanadium dioxide and anti-reflection coating on a silicon or other appropriate transparent substrate. An insulating layer such as silicon oxide and a highly conducting transparent layer such as microcrystalline silicon are added to form a MIS diode that can impart an electric field to induce a phase transition in $VO_2$ and control the transmission of optical radiation. It is further appreciated that in addition to $VO_2$, all other vanadium oxides exhibit SMT at specific temperatures as shown in TABLE 2 below and can be used as an alternate semiconductor material to $VO_2$. In particular, $V_3O_5$ has a high phase transition temperature of 430° K (157° C.) so it can be used when operation of the MIS filter at high temperatures is required. The phase transition temperature of the other vanadium oxides is lower than room temperature, so they can be used in low temperature environments such as in outer space. Also, the phase transition temperature can be tuned by doping vanadium oxides with transition metals. For example, in $VO_2$, substitute of $V^{4+}$ with $W^{6+}$, $Mo^{6+}$ and $Nb^{5+}$ lowers the $T_{SMT}$, whereas $Cr^{3+}$, $GA^{3+}$ and $Al^{3+}$ raises the $T_{SMT}$. Tungsten ($W^{6+}$) is the most efficient. It lowers $T_{SMT}$ by 18-24° C./at %.

TABLE 2

Semiconductor to Metal Phase Transition of Vanadium Oxides

| V Oxide | $T_{SMT}$ (K) |
|---|---|
| $V_8O_{15}$ | 70 |
| $V_9O_{17}$ | 79 |
| $V_5O_9$ | 135 |
| $V_2O_3$ | 168 |
| $V_6O_{11}$ | 170 |
| $V_4O_7$ | 250 |
| $VO_2$ | 340 |
| $V_3O_5$ | 430 |

Figure 6:
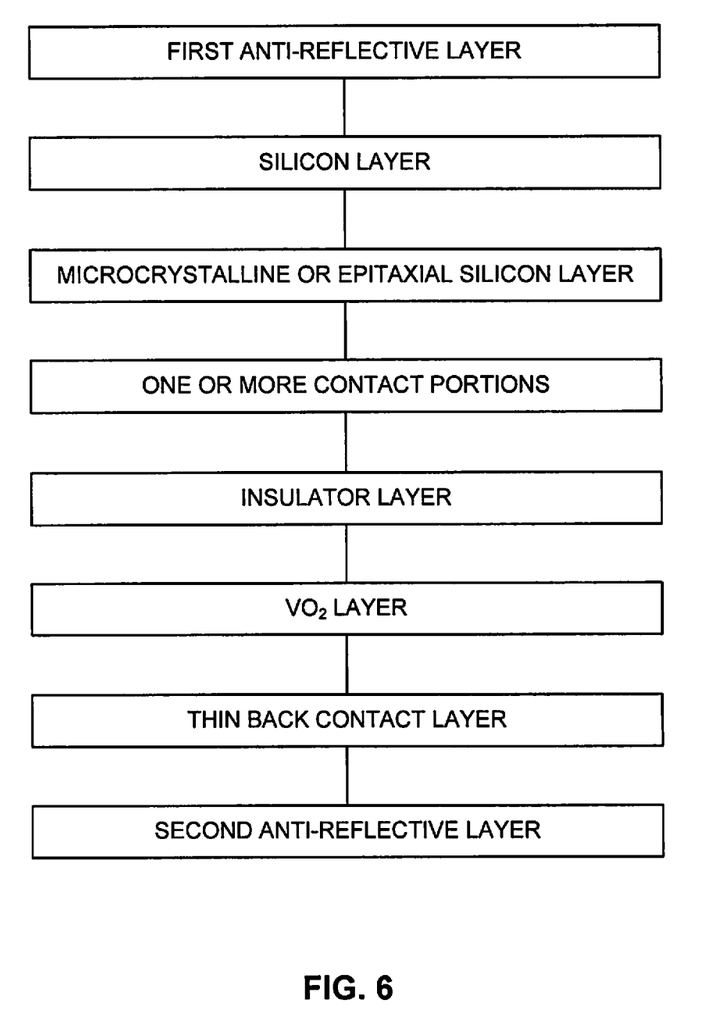
FIG. 6 illustrates a method of manufacturing a switchable optical filter in accordance with an embodiment of the present application.

Moreover, a person of ordinary skill in the art will understand from the description above that embodiments of the present application may also be described in terms of methods of making and methods of using the described switchable optical filter devices and devices that utilize the described optical filters. For example, referring to FIG. 6, a method 600 of manufacturing a switchable optical filter may comprise forming/depositing a plurality of layers including a first AR layer 601, a silicon layer 602, a microcrystalline or epitaxial silicon layer 603, one or more contact portions 604, an insulator layer 605 (such as $SiO_2$), a $VO_2$ layer 606, a $VO_x$ (x<2) thin back contact layer 607, and a second AR layer 608. These layers may be created, deposited, formed, etc., using one or more of any microfabrication techniques such as deposition, growth, etching, patterning, microforming, and the like.

Figure 7:
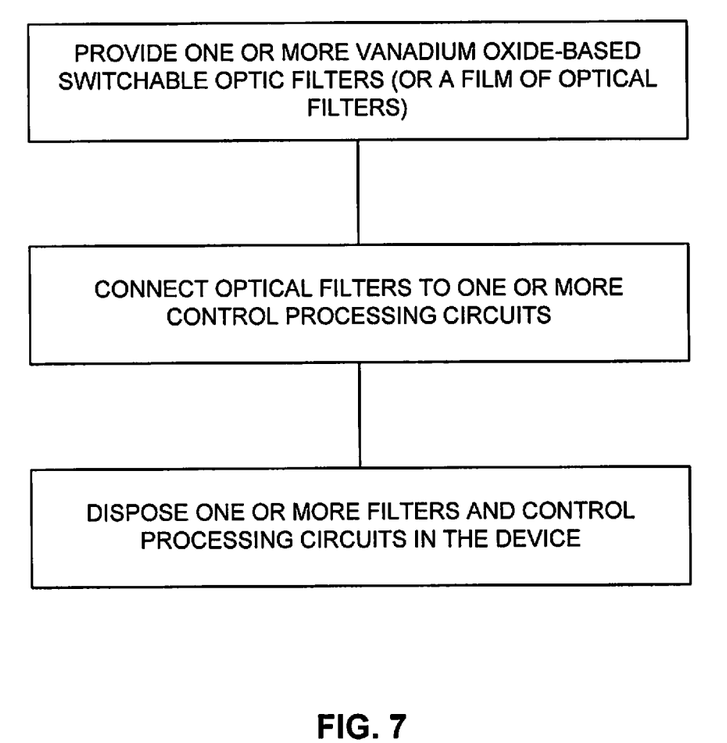
FIG. 7 illustrates a method for making a device utilizing a vanadium oxide-based (e.g., $VO_2$) switchable optic filter in accordance with an embodiment of the present application.

In yet another embodiment, such as illustrated in the flowchart of FIG. 7, a method for making a device utilizing a vanadium oxide-based (e.g., $VO_2$) switchable optic filter 700 is disclosed. Method 700 includes providing one or more vanadium oxide-based (e.g., $VO_2$) switchable optic filters (or a film of said optical filters) 701, connecting said optical filters to one or more control processing circuits 702, and disposing the one or more filters and control processing circuits in the device 703. Such a device may be any device which benefits from the switchable filters described herein, e.g., lasers, smart windows/shutters, sensors, etc.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. An optical filter element comprising:
   a substrate layer;
   a vanadium dioxide ($VO_2$) layer;
   an insulating layer; and
   a conductive layer,
   wherein the substrate layer, the $VO_2$ layer, the insulating layer, and the conductive layer form a Metal-Insulator-Semiconductor (MIS) configured to impart an electric field that induces a reversible phase transition in the $VO_2$ layer from optically transparent to opaque to control the transmission of optical radiation.

2. The optical filter element of claim 1, further comprising an anti-reflective (AR) coating disposed on the substrate.

3. The optical filter element of claim 2 wherein the AR coating includes a germanium layer.

4. The optical filter element of claim 1 further configured to receive carrier injection via photoexcitation.

5. The optical filter element of claim 4 wherein said photoexcitation causes the respective inversion or accumulation layers in p-type or n-type $VO_2$ to be modified to accommodate the generated carriers.

6. The optical filter element of claim 1 further configured such that the voltage required to induce a semiconductor to metal phase transition in the $VO_2$ layer is in the range of 1 to 9 volts.

7. The optical filter element of claim 6 wherein the thickness of the insulating layer is between 500 A and 3000 A.

8. The optical filter element of claim 1 further configured to have an operating mode where an MIS diode may be biased to the point where an incident laser triggers a $VO_2$ phase transition thereby cutting off transmission in the region of the laser.

9. An apparatus comprising:
   a thin film having a plurality of optical filters, said optical filters comprising:
   a substrate layer;
   a degenerately doped low resistivity layer disposed on the substrate layer;
   an insulating layer disposed on the low resistivity layer;
   a vanadium oxide-based layer disposed on the insulating layer, wherein the vanadium oxide-based layer is configured to reversibly change from optically transparent to opaque while undergoing a phase transition; and
   one or more contact portions configured to enable switching of the optical filters; and
   at least one control circuit configured to control switching of the plurality of optical filters.

10. The apparatus of claim 9, wherein the plurality of optical filters further comprise at least one anti-reflective (AR) coating.

11. The apparatus of claim 10 wherein the at least one AR coating includes a germanium layer.

12. The apparatus of claim 9 wherein the plurality of optical filters further comprise an oxygen deficient $VO_x$ layer.

13. The apparatus of claim 9 wherein the vanadium oxide-based layer is a $VO_2$ layer.

14. The apparatus of claim 13 wherein further voltage required to induce a semiconductor to metal phase transition in the $VO_2$ layer is in the range of 1 to 9 volts.

15. The apparatus of claim 14 wherein further configured such that the thickness of the insulating layer is between 500 A and 3000 A.

16. The apparatus of claim 9 wherein the insulating layer comprises silicon dioxide ($SiO_2$).

17. The apparatus of claim 9 wherein the degenerately doped low resistivity layer is one of a microcrystalline or epitaxial silicon layer.

18. The apparatus of claim 9 wherein the plurality of optical filters are configured to implement a carrier injection induced semiconductor to metal phase transition of the vanadium oxide layer.

19. A method for manufacturing a switchable optical filter, said method comprising:
   providing a substrate layer;
   depositing a degenerately doped low resistivity layer on the substrate layer;
   depositing an insulating layer on the low resistivity layer;
   depositing a vanadium oxide-based layer on the insulating layer, wherein the vanadium oxide-based layer is configured to reversibly change from optically transparent to opaque while undergoing a phase transition; and
   depositing one or more contact portions configured to enable switching of the optical filters.

20. The method of claim 19 further comprising depositing at least one anti-reflective coating layer.

* * * * *